UNITED STATES PATENT OFFICE.

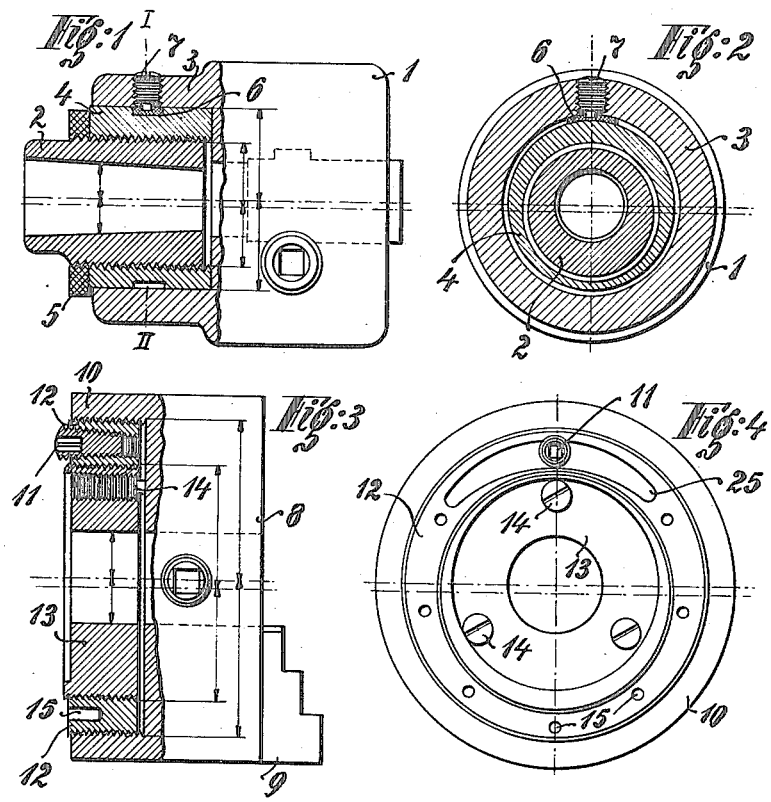

MARTIN STEUDNER, OF LUSAN, NEAR GERA, GERMANY.

ADJUSTING DEVICE FOR TOOL-CHUCKS.

1,157,817.  Specification of Letters Patent.  Patented Oct. 26, 1915.

Application filed June 9, 1914. Serial No. 844,080.

*To all whom it may concern:*

Be it known that I, MARTIN STEUDNER, a citizen of the German Empire, and a resident of Lusan, near Gera, Germany, have invented certain new and useful Improvements in Adjusting Devices for Tool-Chucks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an adjusting device for tool chucks and more particularly for 2, 3 and 4 jaw chucks in order to compensate wear and irregularities for the purpose of producing concentric work; it is also intended to be employed for eccentric adjustment of tools.

The essence of the invention resides in the fact that between the shank to be fixed on the tool spindle and the tool holder, an intermediate part is arranged which, on the one hand is concentrically rotatable relatively to the tool holder, and on the other eccentrically rotatably relatively to the shank, the latter being arranged eccentrically to the spindle of the machine.

A number of embodiments of the invention are illustrated by way of example in the accompanying drawing, in which:

Figure 1 is a partial longitudinal section through a two-jaw chuck. Fig. 2 is a cross section on line I—II, Fig. 1. Fig. 3 is a similar section as Fig. 1 through a three-jaw chuck. Fig. 4 is an end view of the chuck.

In Figs. 1 and 2, 1 is the part holding the two jaws which at its rear part is formed as a ring or plate 3. Inside this ring and concentrically with the normal axis of the chuck (see the arrow) an eccentric ring 4 is arranged and in this ring the fixing device 2 (hollow shank) for the spindle of the drilling machine or the like is rotatably fitted by means of a screw thread. The inner cavity of this part 2 is concentric with the main axis as indicated by the arrows. The innermost part 2 can be rotated relatively to the part 4 and owing to the eccentric formation, the eccentric position is shifted in such a manner that a greater or smaller degree of eccentricity can be obtained. The parts 2 and 4 can be locked by means of a lock nut 5 or in any other convenient manner. The outer plate 3 and the body 1 of the chuck can be rotated about the plate 4 and, as will at once be apparent, the direction of the eccentricity is determined by this. Fixing is effected by means of the screw 7 and the interposed pressure member 6.

With this construction the following results are obtained: If it be desired to effect eccentric treatment with a tool, the eccentricity can be readily obtained by rotating the parts 2, 4, the direction of the eccentricity being adjusted by shifting the part 3. By means of this adjustment, it is possible to produce eccentric treatment of the desired magnitude in the desired directions. The device can also be employed for the exactly concentric adjustment of jaw chucks which have become eccentric in course of time owing to wear of the jaws for example. For this purpose, it is only necessary to adjust the parts 2, 4 and 3 until a fresh central axis for the jaws has been obtained which is completely concentric. A drill or the like clamped in this chuck then acts concentrically and it is of course immaterial that the rest of the device, that is to say the parts 3 and 4, are eccentric as they exert no influence on the central drilling.

The construction of the jaw chuck in Figs. 3 and 4 is as follows: 8 is the part carrying the clamping jaws 9. It ends in a plate 10 whose internal diameter is threaded and which is formed concentrically to the normal or main axis of the clamping chuck. A ring 12 is located in the plate; the internal diameter of this ring is turned eccentrically and a plate 13 (hollow shank) which also forms a cam is fitted by means of screw thread into this diameter, its inner opening which serves for fixing on the machine tool is concentric with the main axis, as indicated by the arrow.

The operations are substantially the same as those already explained with reference to Figs. 1 and 2. When the ring 12 is adjusted it is fixed by clamping, a tapered screw 11 acting to pry apart a slot 25. The ring 13 is fixed relatively to the ring 12 by screws 14 which can be pressed against the chuck 8. 15 are openings for the adjusting key.

What I claim and desire to secure by Letters Patent, is:

1. Adjusting device for tool chucks comprising in combination an inner shank turned eccentrically, an eccentrically turned intermediate member surrounding the said shank and a hollow cylindrical member surrounding the said intermediate member and adapted to be rigidly connected to the back of the tool chuck.

2. Adjusting device for tool chucks comprising in combination an inner hollow shank turned eccentrically, an intermediate eccentrically turned member surrounding the said shank adapted to be mounted in a tool chuck with the periphery of said intermediate member located concentrically with the axis of the tool axis.

3. Adjusting device for tool chucks comprising in combination a tool chuck formed as a ring at its rear part, an eccentric ring member arranged within the said ring, an inner fixing device for attachment to the spindle of a driving spindle said inner fixing device being eccentrically formed and rotatably mounted by a screw thread in the said eccentric ring member.

4. Adjusting device for tool chucks comprising in combination an inner shank turned eccentrically adapted to be adjustably rotated by a screw thread and locked in any desired position within a surrounding ring member also eccentrically turned, the said ring member being adapted to be adjustably rotated to and fixed in any desired position within a ring-shaped extension from the tool chuck.

5. Adjusting device for tool chucks comprising in combination a central hollow member to be carried on the driving spindle, said member being turned eccentrically and screw threaded, on the exterior, an intermediate eccentric ring member adjustably rotatable on the screw thread of the said hollow shank, said ring-member being screw threaded on its outer periphery, an outer ring member screw threaded inside to receive the intermediate ring-member, said outer member being rigidly connected to the body of the chuck, and a tapered clamping screw arranged in a slot in the said intermediate ring member.

In testimony whereof I affix my signature in presence of two witnesses.

MARTIN STEUDNER.

Witnesses:
  KARL BARTH,
  ALFRED EISEL.